United States Patent

[11] 3,604,784

| [72] | Inventors | Anthony W. Louderback<br>Long Beach;<br>Morris A. Zook, Jr., Monterey Park, both of, Calif. |
|---|---|---|
| [21] | Appl. No. | 792,543 |
| [22] | Filed | Jan. 21, 1969 |
| [45] | Patented | Sept. 14, 1971 |
| [73] | Assignee | Bausch & Lomb Incorporated<br>Rochester, N.Y. |

[54] ANTIREFLECTION COATINGS
5 Claims, 7 Drawing Figs.

[52] U.S. Cl. .................................................. 350/164, 117/33.3
[51] Int. Cl. .................................................. G02b 1/10
[50] Field of Search ........................................ 350/163–166; 117/33.3

[56] References Cited
UNITED STATES PATENTS

| 2,478,385 | 8/1949 | Gaiser | 350/164 |
| 3,147,132 | 9/1964 | Geffckien | 350/164 UX |
| 3,185,020 | 5/1965 | Thelen | 350/164 |
| 3,268,352 | 8/1966 | Davy et al. | 350/164 X |
| 3,463,574 | 8/1969 | Basfien et al. | 350/166 X |

*Primary Examiner*—David Schonberg
*Assistant Examiner*—Toby H. Kusmer
*Attorneys*—Frank C. Parker and James C. Simmons

ABSTRACT: An antireflection coating for a light-reflecting substrate substitute three layers. Thickness of the layer adjacent the substrate is effectively one-quarter or one-half wavelength in optical thickness depending upon the index of refraction of the substrate. The middle layer is effectively one-half wavelength in optical thickness comprising a mixture of metallic oxides and the third layer is effectively one-quarter wavelength in optical thickness. A method of applying the middle layer of the coating employs directing a stream of oxygen at an electron beam which is directed at a source of coating material.

ANTHONY W. LOUDERBACK
MORRIS A. ZOOK JR.
INVENTORS

ANTHONY W. LOUDERBACK
MORRIS A. ZOOK JR.
INVENTORS

BY *James C. Simmon*

ATTORNEY

ANTHONY W. LOUDERBACK
MORRIS A. ZOOK JR.
INVENTORS

BY *James C. Simmons*
ATTORNEY

ANTIREFLECTION COATINGS

BACKGROUND OF THE INVENTION

1. Field of the Invention

This invention relates to multilayer antireflection coatings for application to optical systems for substantially eliminating reflections over a relatively wide range of the visible spectrum.

2. Brief Description of the Prior Art

A particularly effective multilayer antireflection coating is disclosed by Alfred J. Thelen in U.S. Pat. No. 3,185,020 granted May 25, 1965. In the Thelen patent there is disclosed a three-layer coating consisting of a first layer deposited on a substrate one-quarter wavelength in optical thickness, a second layer one-half wavelength in optical thickness and a third layer one-quarter wavelength in optical thickness. The coating is placed on a substrate by use of well-known vacuum coating techniques. The beforementioned patent further discloses that it may be desirable to use a mixed oxide for the second or middle layer.

A well-known coating technique using oxygen introduced into the coating chamber is disclosed in U.S. Pat. No. 2,784,115 granted to D. S. Brinsmaid et al. on May 4, 1953. In the Brinsmaid et al. patent there is disclosed the technique of evaporation of titanium dioxide by use of an oxygen-bleeding technique.

SUMMARY OF THE INVENTION

We have discovered that antireflection coatings equal in quality to those disclosed in the Thelen patent and improved for certain selected wavelengths of the visible spectrum can be provided by adjusting the optical thickness of the first layer and using a mixed oxide for the middle layer of the three-layer coating.

We have also found that the improved mixed oxide middle layer can be achieved by introducing oxygen into the vacuum system in an improved manner.

Therefore, it is a primary object of this invention to provide an improved antireflection coating.

It is another object of the present invention to provide an improved three layer antireflection coating employing a mixed oxide in the center layer.

It is still another object of the present invention to provide improved antireflection coatings applicable to substrates having a wide range in refractive index by adjusting the material and optical thickness of the layer next to the substrate.

It is a further object of the present invention to provide an improved method for depositing a coating of a metallic oxide onto a substrate.

DETAILED DESCRIPTION OF THE PREFERRED EMBODIMENTS

Antireflection coatings according to the present invention are applicable to substrates having an index of refraction ($n_D$) of between 1.450 and 1.880.

The coatings according to the present invention comprises a first layer one-quarter or one-half wavelength in optical thickness and of $Al_2O_3$ or MgO depending upon the index of refraction of the substrate. The middle layer comprises a coating of a mixture of oxides of titanium and $Al_2O_3$ one-half wavelength in optical thickness in all cases. The third layer, outermost from the substrate, comprises of $MgF_2$ one-quarter wavelength in optical thickness. In the beforementioned Thelen patent, particularly at Column 2, the vernacular of the prior art, regarding such expressions as "optical thickness," is set forth.

Coatings according to the above requirements are further defined 17 the following Table I wherein the first layer (adjacent the substrate) is set forth for the various substrate indices.

TABLE I

| Coating | Index of refraction of substrate | Material | First layer $n_D$ | Optical thickness* |
|---|---|---|---|---|
| A | 1.45–1.56 | $Al_2O_3$ | 1.64 | ¼ |
| B | 1.56–1.68 | MgO | 1.72 | ¼ |
| C | 1.68–1.78 | $Al_2O_3$ | 1.64 | ½ |
| D | 1.78–1.88 | MgO | 1.72 | ½ |

*Measured in wavelength at 510 nanometers.

For each of the coatings listed in Table I the middle layer is effectively one-half wavelength in optical thickness and comprises a mixture of oxides of titanium and $Al_2O_3$ with an index of refraction of about 2.00. The outermost layer is in each case a layer of $MgF_2$ having an index of refraction of 1.38 and an effective optical thickness of one-quarter wavelength. For the coatings of Table I, a design wavelength of 510 nanometers is preferred.

Coatings according to the above table have been mathematically computed and the results are plotted in FIGS. 2–5.

Figure 2:
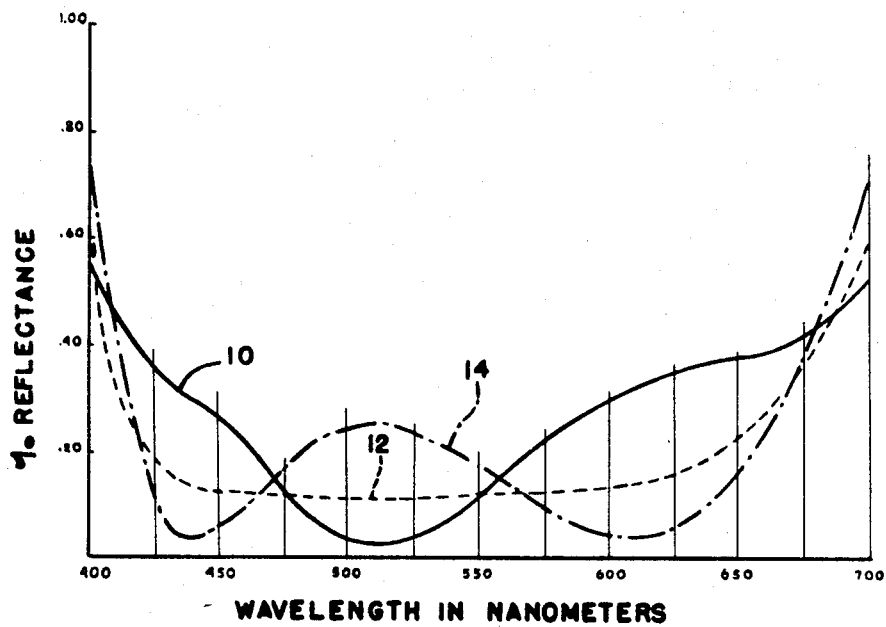
FIG. 2 is a plot of percent reflectance against wavelength measured in nanometers for an antireflection coating according to one embodiment of the present invention for substrates of three different indices of refraction.

Referring to FIG. 2, there is shown several plots of an antireflection coating (coating A of Table I) comprising a glass substrate, a first layer one-quarter wavelength in optical thickness of $Al_2O_3$ having an index of refraction of 1.64, a second layer effectively one-half wavelength in optical thickness having an index of refraction of 2.00 comprising a mixture of oxides of titanium and $Al_2O_3$ and a third layer effectively one-quarter wavelength in optical thickness of MgF having an index of refraction of 1.38. In FIG. 2, a curve 10 is for the coating applied to a substrate having an index of refraction of 1.45, a curve 12 for the coating as applied to a substrate having an index of refraction of 1.51 and a curve 14 for the coating as applied to a substrate having an index of refraction of 1.56. Actual measurements have verified these calculated results for selected wavelengths. Based upon the measured versus calculated data we have found that the similarity is such to warrant substitution freely of computed data for actual data and vice versa.

Figure 3:
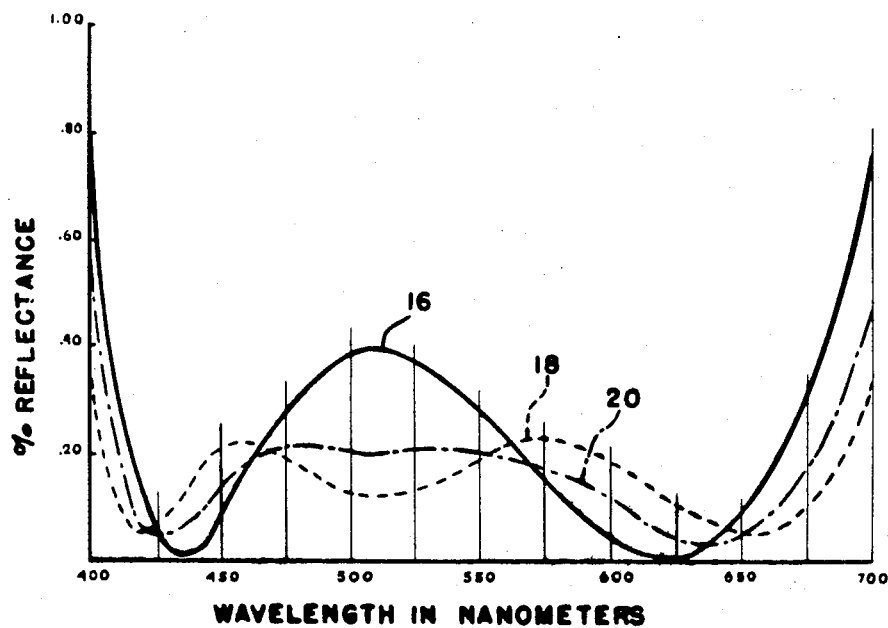
FIG. 3 is a plot of percent reflectance against wavelength measured in nanometers for an antireflection coating according to another embodiment of the present invention for substrates of three different indices of refraction.

FIG. 3 shows an antireflection coating (coating C of Table I) similar in material composition to the coating of FIG. 2 except that the initial aluminum oxide layer is effectively one-half wavelength in optical thickness. In FIG. 3, a curve 16 is for a substrate having an index of refraction of 1.68, a curve 20 for a substrate having an index of refraction of 1.74 and a curve 18 for a substrate having an index of refraction of 1.78.

Figure 4:
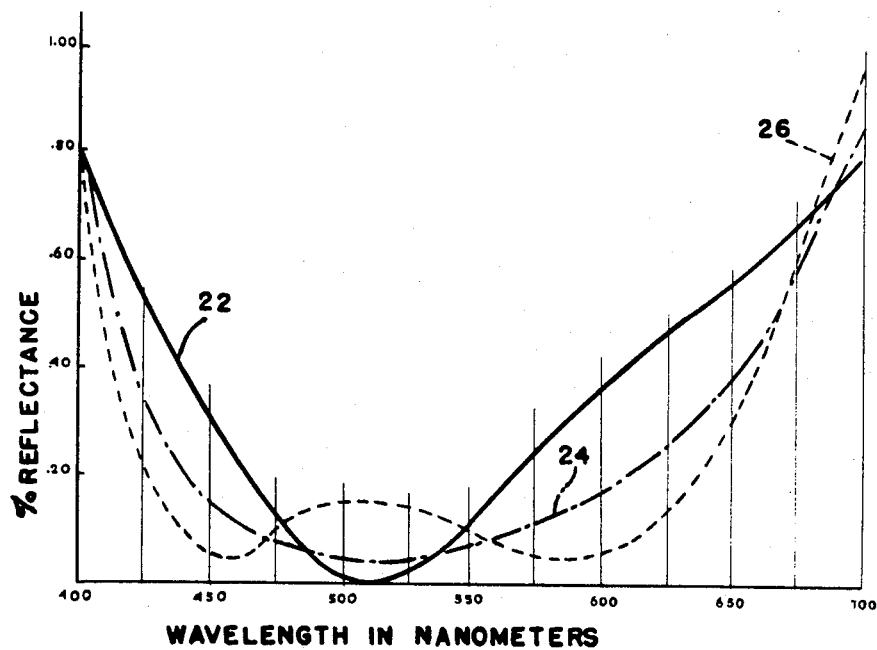
FIG. 4 is a plot of percent reflectance against wavelength measured in nanometers for an antireflection coating according to another embodiment of the present invention for substrates of three different indices of refraction.

FIG. 4 is an antireflection coating (coating B of Table I) similar in structure to the coating of FIG. 2 except that the initial layer deposited on the substrate comprises magnesium oxide having an index of refraction of 1.72 and an effective optical thickness of one-quarter wavelength. In FIG. 4, a curve 22 is for the coating as applied to a substrate with an index of refraction of 1.56, a curve 24 for a substrate having an index of refraction of 1.62 and a curve 26 for a substrate having an index of refraction of 1.68.

Figure 5:
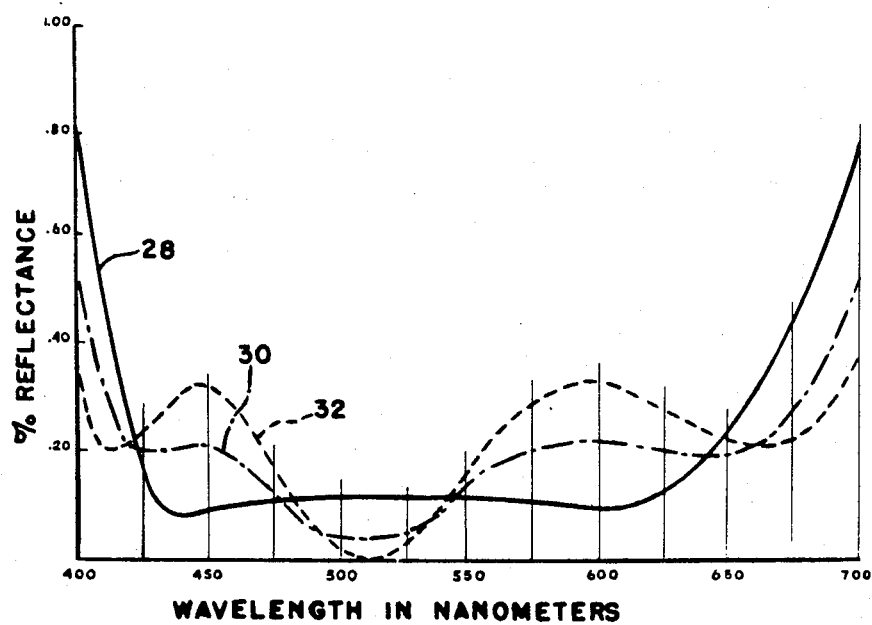
FIG. 5 is a plot of percent reflectance against wavelength measured in nanometers for an antireflection coating according to another embodiment of the present invention for substrates of three different indices of refraction.

FIG. 5 is a plot for a coating (coating D of Table I) similar in structure to the coating of FIG. 3 except that the initial layer is magnesium oxide having an index of refraction of 1.72 and an effective optical thickness of one-half wavelength. In FIG. 5, a curve 28 is for the coating as applied to a substrate with an index of refraction of 1.78, a curve 30 for a substrate having an index of refraction 1.84 and a curve 32 for a substrate having an index of refraction of 1.88.

Figure 6:
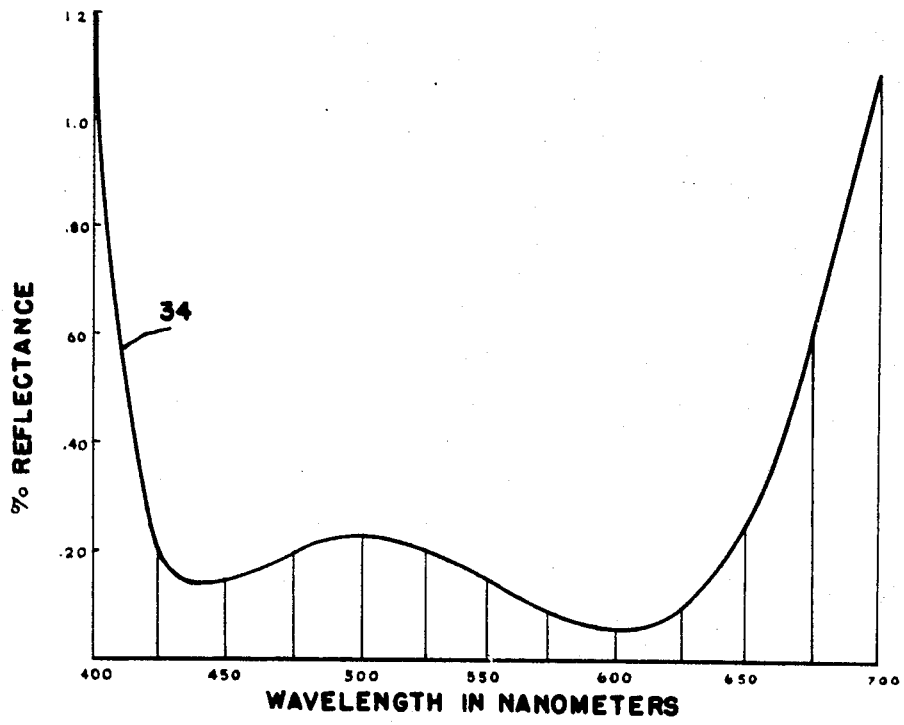
FIG. 6 is a plot of percent reflectance against wavelength measured in nanometers for an actual coating constructed according to one embodiment of the present invention.

A curve 34 of FIG. 6 is a plot of measure reflectance against wavelength for a Type B coating (Table I) applied to a substrate having an index of refraction of 1.679.

Figure 7:
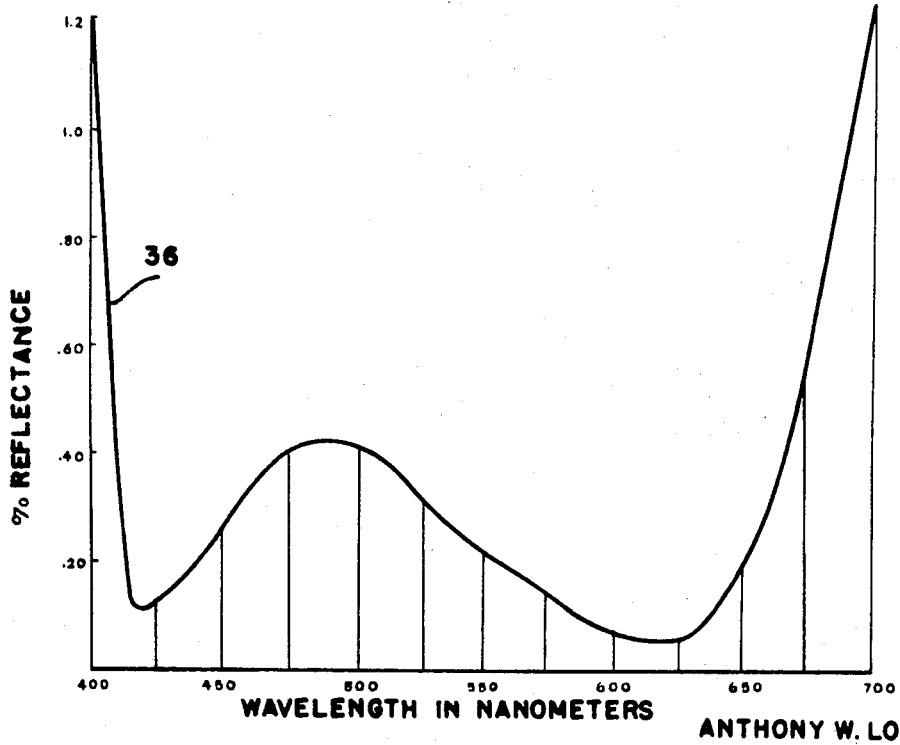
FIG. 7 is a plot of percent reflectance against wavelength measured in nanometers for an actual coating constructed according to another embodiment of the present invention.

A curve 36 of FIG. 7 is a plot of measured reflectance against wavelength for a Type C coating (Table I) applied to a substrate having an index of refraction of 1.751.

Comparing the curves 34 and 36 with the curves 26 and 18 respectively, it is apparent that actual results are predictable from computed curves.

One method of evaluating coatings for other than optical properties is to subject a coated substrate to a series of physical tests. These tests comprise procedures to determine resistance to abrasion, dissolving moisture and humidity and a salt spray. The above physical tests are well known and established standards for military specifications for coatings of this type. We have found that when our coatings are subjected to the above-mentioned physical tests, they performed in an acceptable manner. In other words, coatings constructed according to the principles of the present invention will withstand exposure to an atmosphere of 98 percent relative humidity at 120° F. for 24 hours, will not dissolve when immersed in a solution of 6 ounces of NaCl per gallon of water at room temperature for 24 hours, will not show peeling or other marks after being coated with with a piece of cellophane tape and the tape pulled away, and the coatings will withstand exposure to a standard salt spray test.

In addition, the coatings will show optical properties below the maximum reflectance values as set forth in the following Table II.

TABLE II

| Substrate index | Wavelength range | Maximum percent reflectance |
| --- | --- | --- |
| 1.450–1.619 | 425–650 mu | 0.6 absolute. |
|  | 425–675 mu | 0.4 average. |
|  | 500–620 mu | 0.35 average. |
| 1.620–1.850 | 440–630 mu | 0.6 absolute. |
|  | 425–675 mu | 0.5 average. |
|  | 500–620 mu | 0.35 average. |

Figure 1:
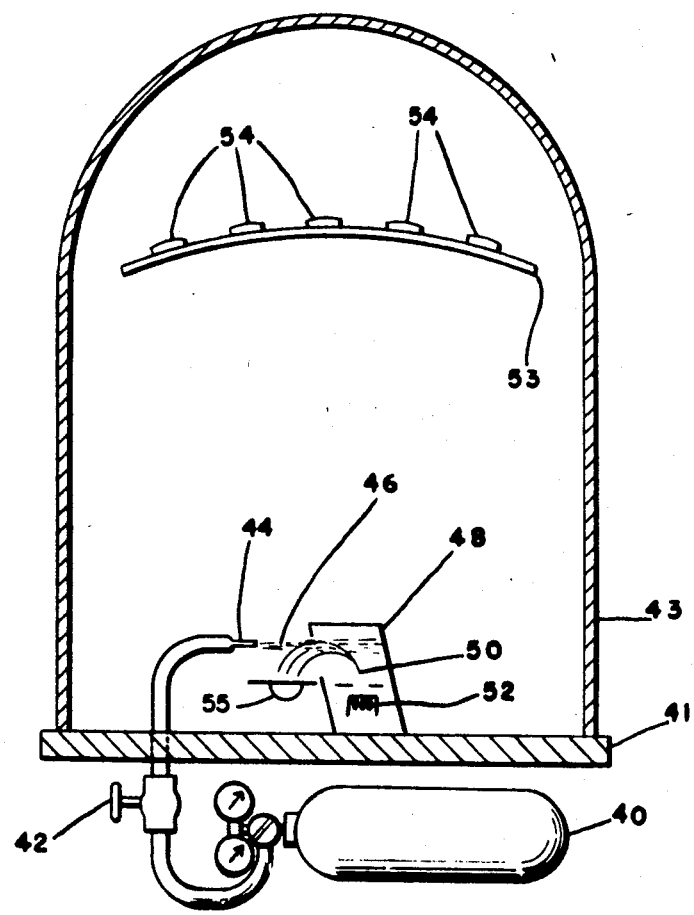
FIG. 1 is a schematic drawing of a vacuum coating apparatus embodying the principles of the present invention.

Coatings constructed according to the principles of the present invention can be applied using a conventional vacuum coating apparatus modified according to the principles of the present invention as disclosed in FIG. 1. Referring to FIG. 1, there is shown a schematic diagram of an optical coating system. The system comprises a baseplate 41 and a bell jar 43 capable of maintaining a vacuum seal with the baseplate 41. A source of oxygen 40 is provided for applying the middle layer of the proposed coatings. The oxygen is admitted to the vacuum system through any suitable conduit and monitored by a needle valve 42 to adjust the oxygen level to the nozzle 44, thereby producing a defined oxygen stream 46. Disposed on the baseplate 41 is an electron-emitting filament 52 which emits a beam of electrons 50. The beam of electrons 50 is directed toward a source 55 of coating material by means of an electromagnet 48. Within the bell jar 43 is a holding device 53 for holding a plurality of substrates 54 to be coated.

To produce a coating according the principles of the present invention the substrates 54 are placed on the holding device 53, the coating materials placed in the receptacle 55 and the system pumped down to a vacuum of approximately $3 \times 10^{15}$ torr. The substrates 54 are heated to approximately 500° F. by heaters (not shown). If the initial layer is to be $Al_2O_3$, the starting material is fused alumina approximately 60 mesh in size. The vacuum is adjusted to $7-9 \times 10^{15}$ torr by bleeding oxygen through the nozzle 44. The electron beam 50 is then produced and the coating deposited to the desired optical thickness, depending upon the substrate index, using known monitoring techniques. If the initial layer is to be MgO the same technique is used, except that the starting material is preferably in crystalline form.

The middle layer is deposited from a mixture of 60-mesh electronically fused $Al_2O_3$ powder and a powdery mixture of oxides of titanium. The oxides of titanium can be made by fusing a reagent grade $TiO_2$ powder under a vacuum of about $10^{14}$ torr using heat to liquify the powder. When the powder is liquified, it is allowed to crystallize and the crystallized substance is ground into a fine powder. The resulting powder contains partial reduction products of $TiO_2$, namely $TiO$, $Ti_2O_3$, and $TiO_2$. The materials having been placed in the holder 55, the vacuum system is turned on and the bell jar 43 evacuated to about $3 \times 10^{15}$ torr. Oxygen is then admitted into the vacuum chamber, as shown in FIG. 1 by the oxygen stream 46, and directed into the electron beam 50 and the vacuum adjusted or allowed to reach $2.5 \times 10^{14}$ torr. We believe that the oxygen stream 46 directed at the electron beam 50 is slightly ionized making it more reactive and causing a better coating. We are not sure whether the oxygen reacts with the oxides of titanium at the source 55 of coating material, on the surface of the substrate 54 or in the chamber deposited between the source 55 and the substrate 54. However, this technique will produce a middle layer of the required index of refraction, namely 2.00. Deposition of this layer is also monitored by well-known monitoring techniques.

The final layer of $MgF_2$ can be deposited by any conventional coating technique. An electron beam 50 in a vacuum of approximately $3 \times 10^{15}$ torr to deposit the $MgF_2$ layer is suggested.

After the final layer is deposited the substrates 54 are allowed to cool and afterwards they can be removed safely from the vacuum coating system.

The oxygen-bleeding technique employed in our invention is a generation beyond that disclosed in the aforementioned Brinsmaid et al. patent, in that significantly better vacuums are employed and the introduction of the oxygen is in a well-defined stream 46 directed at the beam of electrons 50 rather than the source of electrons, heaters or holders containing the material to be evaporated. This gives a superior mixed oxide coating for embodiments constructed according to the principles of our invention.

Having thus described our invention by reference to several specific embodiments, we wish it understood that the invention is to be limited only according to the scope of the appended claims.

1. A nonabsorbing substantially colorless multilayer antireflecting coating for use on a substrate having light-reflecting surfaces and an index of refraction of between 1.68 and 1.88, comprising:
   a first layer deposited on the substrate of a metallic oxide having an index of refraction of 1.64 to 1.72 and an effective optical thickness of one-half of a design wavelength;
   a second layer deposited on the first layer of a mixture of at least two metallic oxides having an index of refraction of about 2.00, effectively one-half of the design wavelength in optical thickness; and
   a third layer deposited on the second layer of magnesium fluoride having an effective optical thickness of one-quarter of the design wavelength.

2. The coating according to claim 1, wherein the second layer consists of a mixture of aluminum oxide and oxides of titanium.

3. The coating according to claim 1, wherein the index of refraction of the substrate is between 1.68 and 1.78 and the first layer is aluminum oxide having an index of refraction of approximately 1.64.

4. The coating according to claim 1, wherein the index of refraction of the substrate is between 1.78 and 1.88 and the first layer is magnesium oxide having an index of refraction of about 1.72.

5. The coating according to claim 1, wherein the design wavelength if 510 nanometers.